US008190781B2

(12) United States Patent
Liu et al.

(10) Patent No.: US 8,190,781 B2
(45) Date of Patent: May 29, 2012

(54) EXPOSING MULTI-MODE AUDIO DEVICE AS A SINGLE COHERENT AUDIO DEVICE

(75) Inventors: Cheng-mean Liu, Redmond, WA (US); Elliot H Omiya, Kirkland, WA (US); Daniel J Sisolak, Issaquah, WA (US); Frank Dominic Yerrace, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/144,615

(22) Filed: Jun. 23, 2008

(65) Prior Publication Data

US 2009/0319692 A1 Dec. 24, 2009

(51) Int. Cl.
*G06F 3/00* (2006.01)

(52) U.S. Cl. .......................................................... 710/3

(58) Field of Classification Search ....................... 710/3
See application file for complete search history.

(56) References Cited

U.S. PATENT DOCUMENTS 5,768,126 A * 6/1998 Frederick ........................ 700/94
6,748,085 B1 6/2004 Yang
7,043,205 B1 5/2006 Caddes et al.
7,269,388 B2 9/2007 Poursabahian et al.
2003/0161292 A1 8/2003 Silvester
2004/0184617 A1 9/2004 Ono
2005/0070336 A1 3/2005 Tamura
2005/0078944 A1* 4/2005 Risan et al. ..................... 386/94
2005/0289559 A1* 12/2005 Illowsky et al. .............. 719/318
2006/0003802 A1* 1/2006 Sinai .......................... 455/553.1
2006/0072525 A1 4/2006 Hillyard et al.
2006/0079182 A1 4/2006 Matsuda
2007/0197160 A1 8/2007 Health et al.
2007/0256547 A1 11/2007 Feeney et al.
2007/0259621 A1 11/2007 Lin et al.
2008/0032752 A1* 2/2008 Tamura ...................... 455/569.1
2008/0051156 A1* 2/2008 Matsuda .................... 455/569.2
2008/0176584 A1* 7/2008 Zaffino ...................... 455/456.6

OTHER PUBLICATIONS

"LinTech Bluetooth Multiprofile Module", retrieved at <<http://www.lintech.de/files/db/dbl_lt1440_022008_engl.pdf>>, pp. 2.
"Specification of the Bluetooth System", Version 1.1, Feb. 22, 2001, Bluetooth SIG, Inc., pp. 1-452.
"Multi-Profile Bluetooth Software Development Tool", Cambridge Consultants Ltd, 2005, pp. 2.
ISA Korean Intellectual Property Office, International Search Report of PCT/US2009/048343, Jan. 29, 2010, Korea, 3 pages.

* cited by examiner

*Primary Examiner* — Chun-Kuan Lee
*Assistant Examiner* — Ronald Modo
(74) *Attorney, Agent, or Firm* — Alleman Hall McCoy Russell & Tuttle LLP

(57) ABSTRACT

The driving of an audio device that supports two or more audio modes is accomplished by associating a first physical device object of an audio device with a first device identifier, the first physical device object representing a first audio mode enumerated by a bus enumerator; associating a second physical device object of an audio device with a second device identifier, the second physical device object representing a second audio mode enumerated by the bus enumerator; and if the first device identifier matches the second device identifier, enabling a coupled kernel streaming audio interface compatible with both the first physical device object and the second physical device object.

17 Claims, 11 Drawing Sheets

EXPOSING MULTI-MODE AUDIO DEVICE AS A SINGLE COHERENT AUDIO DEVICE

BACKGROUND

Many wireless audio devices, such as Bluetooth® audio devices, support multiple audio modes. Each audio mode of a wireless audio device is often treated by a host computing device as a separately addressable programming entity in initializing, manipulating and streaming of audio data, and each audio mode is often exposed by the host computing device as a separate sound input or output when displayed as a visual element by the operating system.

However, due to computing resource constraints, each wireless audio device often can operate only one audio mode at a time. Yet, an end user may see multiple visual elements for a single wireless audio device, and may expect the wireless audio device to be able to operate multiple audio modes at the same time. Consequently, the audio device may not behave as expected. Similarly, a programmer may see multiple independently addressable items in a programming API.

SUMMARY

The driving of an audio device that supports two or more audio modes is disclosed. Each supported audio mode is associated with a physical device object and a device identifier. When two or more physical device objects have matching device identifiers, a coupled kernel streaming audio interface that is compatible with the physical device objects is enabled.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The driving of a wireless audio device that supports two or more audio modes is disclosed. While the driving of a wireless Bluetooth® audio device that supports a Hands-Free Profile (HFP) and an Advanced Audio Distribution Profile (A2DP) is used as an example, it should be understood that other wireless devices that support other audio modes can use the herein described driving process. This disclosure is applicable to the driving of virtually any wireless audio device that is capable of supporting two or more audio modes.

As described in more detail below, the disclosed driving process provides a mechanism to expose a multi-mode wireless audio device, for example in an operating system, as a single coherent audio device, hiding the details and resource constraints of the individual audio modes supported by the multi-mode audio device. For example, the audio modes of a single wireless audio device are treated as a single programmatically addressable item and represented as a single visual element, such as an icon or a list item, rather than a separate element for each audio mode.

Figure 1:
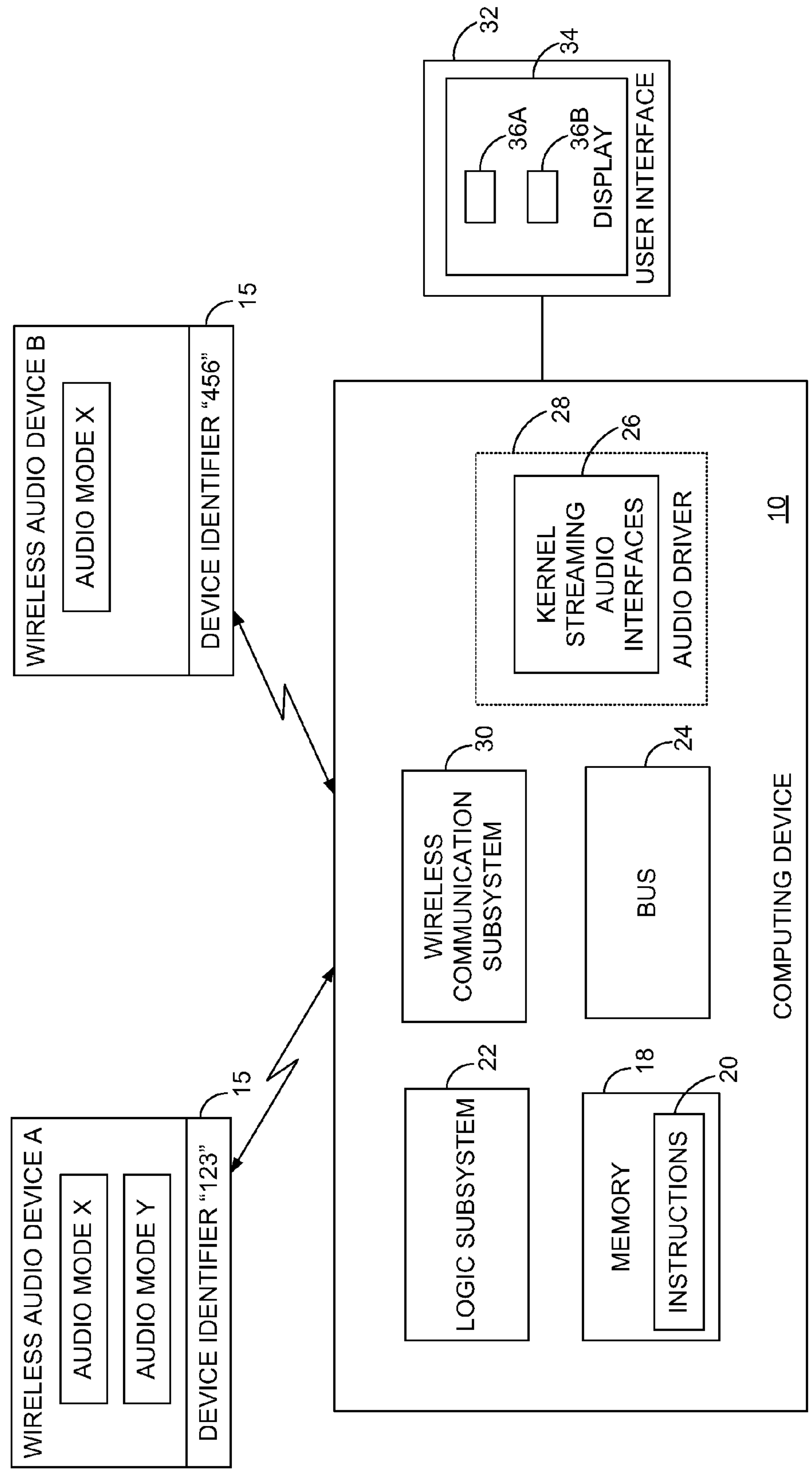
FIG. 1 is a schematic diagram illustrating a computing system for driving a wireless audio device that supports two or more audio modes.

FIG. 1 shows an example computing device 10 that is configured to drive audio devices, such as wireless audio device A and wireless audio device B, which may support one or more audio modes, such as audio mode X and audio mode Y. The computing device may support streaming of audio data between the computing device and the audio devices. The computing device may include computer memory 18 including instructions 20, that when executed by a logic subsystem 22, cause the logic subsystem 22 to perform various processes and routines disclosed herein. The computing device may additionally include a bus 24 and may implement various kernel streaming interfaces, such as kernel streaming audio interface 26. As used herein, the phrase "kernel streaming interface" is used to refer to the lowest level hardware-independent I/o interface, and such an interface may take a variety of different forms in various different architectures. In one example, the kernel streaming audio interface 26 may be implemented by an audio driver 28 of the computing device.

Logic subsystem 22 may be configured to execute one or more instructions. For example, the logic subsystem 22 may be configured to execute one or more instructions that are part of one or more programs, routines, objects, components, data structures, or other logical constructs. Such instructions may be implemented to perform a task, implement an abstract data type, or otherwise arrive at a desired result. The logic subsystem may include one or more processors that are configured to execute software instructions. Additionally or alternatively, the logic subsystem 22 may include one or more hardware or firmware logic machines configured to execute hardware or firmware instructions. The logic subsystem 22 may optionally include individual components that are distributed throughout two or more devices, which may be remotely located in some embodiments.

Memory 18 may be a device configured to hold instructions that, when executed by the logic subsystem, cause the logic subsystem 22 to implement the herein described methods and processes. Memory 18 may include volatile portions and/or nonvolatile portions. In some embodiments, memory 18 may include two or more different devices that may cooperate with one another to hold instructions for execution by the logic subsystem. In some embodiments, logic subsystem 22 and memory 18 may be integrated into one or more common devices.

The computing device may further include a wireless communication subsystem 30 for wirelessly communicating with the audio devices, and a display 32 having a user interface 34 configured to characterize the kernel streaming audio interface, even when the kernel streaming audio interface is a coupled kernel streaming audio interface, by a single audio input end point and a single audio output end point. In other words, the coupled kernel streaming interface is characterized by a single audio input end point and a single audio output end point. As used herein, the phrase "end point" is used to refer to an independently identifiable software object representing an audio input or output. The phrase "end point" should not be construed as being limited to any particular implementation (e.g., the implementation of a particular operating system). For example, the user interface 34 may display single visual element 36A characterizing an audio device as having a single audio input end point, and a single visual element 36B characterizing the same audio device as having a single audio output end point.

Each of the audio devices hosted by the computing device may be identified by a device identifier 15. The audio device may for example be a Bluetooth® audio device identified by a Bluetooth® address. In this example, the computing device is shown hosting wireless audio device A identified by the device identifier "123", and wireless audio device B identified by the device identifier "456". In addition, the wireless audio device A is shown to support two audio modes: audio mode X and audio mode Y, while the wireless audio device B is shown to support a single audio mode: audio mode X. It should be understood that although two wireless audio devices are shown in this example, computing device 10 may potentially host any number of audio devices, including both wireless and non-wireless audio devices.

Figure 2:
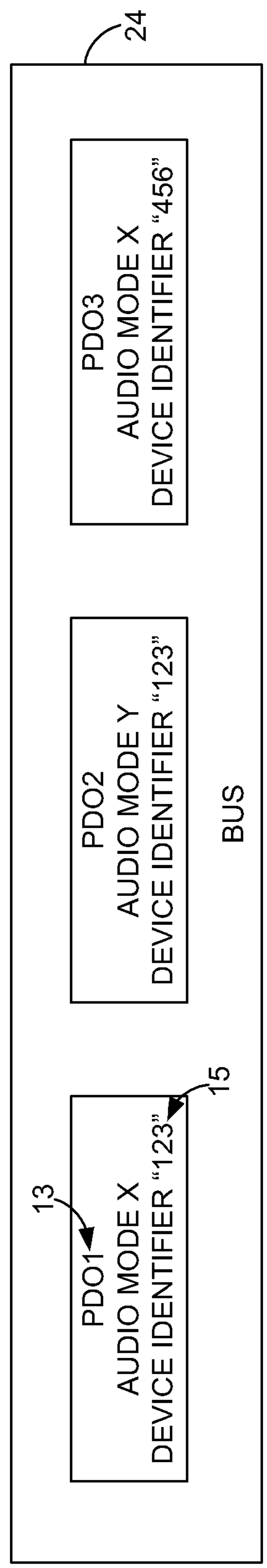
FIG. 2 is a schematic diagram illustrating a bus of the computing device of FIG. 1.

Referring now to FIG. 2, the bus 24 of the computing device may be configured to create or enumerate a separate PDO 13 (physical device object) for each audio mode of the audio device hosted by the computing device. As used herein, the term "PDO" is used to refer to a software object that represents a particular audio mode. The term "PDO" should not be construed as being limited to any particular implementation (e.g., the implementation of a particular operating system). In this example, the bus 24 enumerates PDO1 for the audio mode X of the audio device A, enumerates PDO2 for the audio mode Y of the audio device A, and enumerates PDO3 for the audio mode X of the audio device B.

Figure 3:
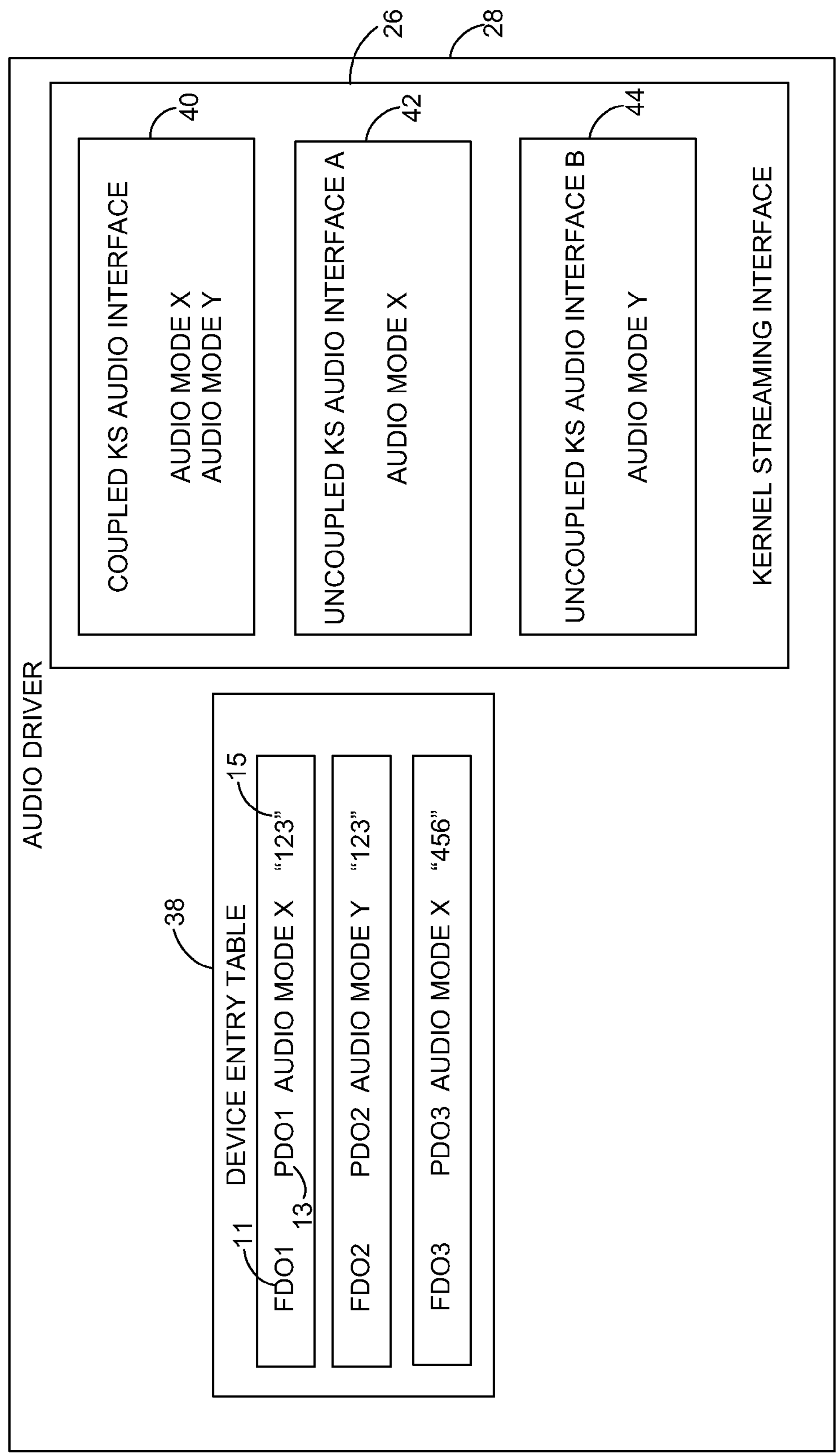
FIG. 3 is a schematic diagram illustrating an audio driver of the computing device of FIG. 1.

Referring now to FIG. 3, the computing device may create, for example via the audio driver 28 of the computing device, a FDO 11 (functional device object) for each PDO 13 enumerated by the bus 24. The audio driver 28 may additionally maintain, for example via the audio driver 28 of the computing device, a device entry table 38. The device entry table 38 may relate each FDO 11 created to the PDO 13 the FDO 11 is created for. The device entry table 38 may be additionally configured to identify the audio mode supported by an FDO 11 and identify the device identifier 15 of the audio device associated with the FDO 11. The computing device may be configured to use the device entry table to match the audio modes of a single audio device using the device identifier 15 associated with the audio mode. The computing device may enable a coupled kernel streaming audio interface compatible with both the first physical device object and the second physical device object if a match exists.

In this example, the device entry table 38 lists the functional device objects FDO1, FDO2, and FDO3 and the associated physical device objects PDO1, PDO2, and PDO3. The device entry table 38 additionally identifies that FDO 1 supports audio mode X, FDO2 supports audio mode Y, and FDO3 supports audio mode X. The device entry table 38 may match the FDO1 with the FDO2 based on the fact that FDO1 and FDO2 are both associated with the same audio device having a device identifier of "123". In contrast, FDO1 and FDO2 are not matched with FDO3, since FDO3 is associated with a different audio device having a device identifier of "456".

Still referring to FIG. 3. The audio driver 28 may implement various types of kernel audio streaming interfaces. In this example, the audio driver 28 may implement a coupled kernel streaming audio interface 40 that supports both audio mode X and audio mode Y, an uncoupled kernel streaming audio interface 42 that supports audio mode X, and an uncoupled kernel streaming audio interface 44 that supports audio mode Y. The audio driver 28 may be configured to internally determine which type of kernel streaming audio interface 26 to implement.

Figure 4:
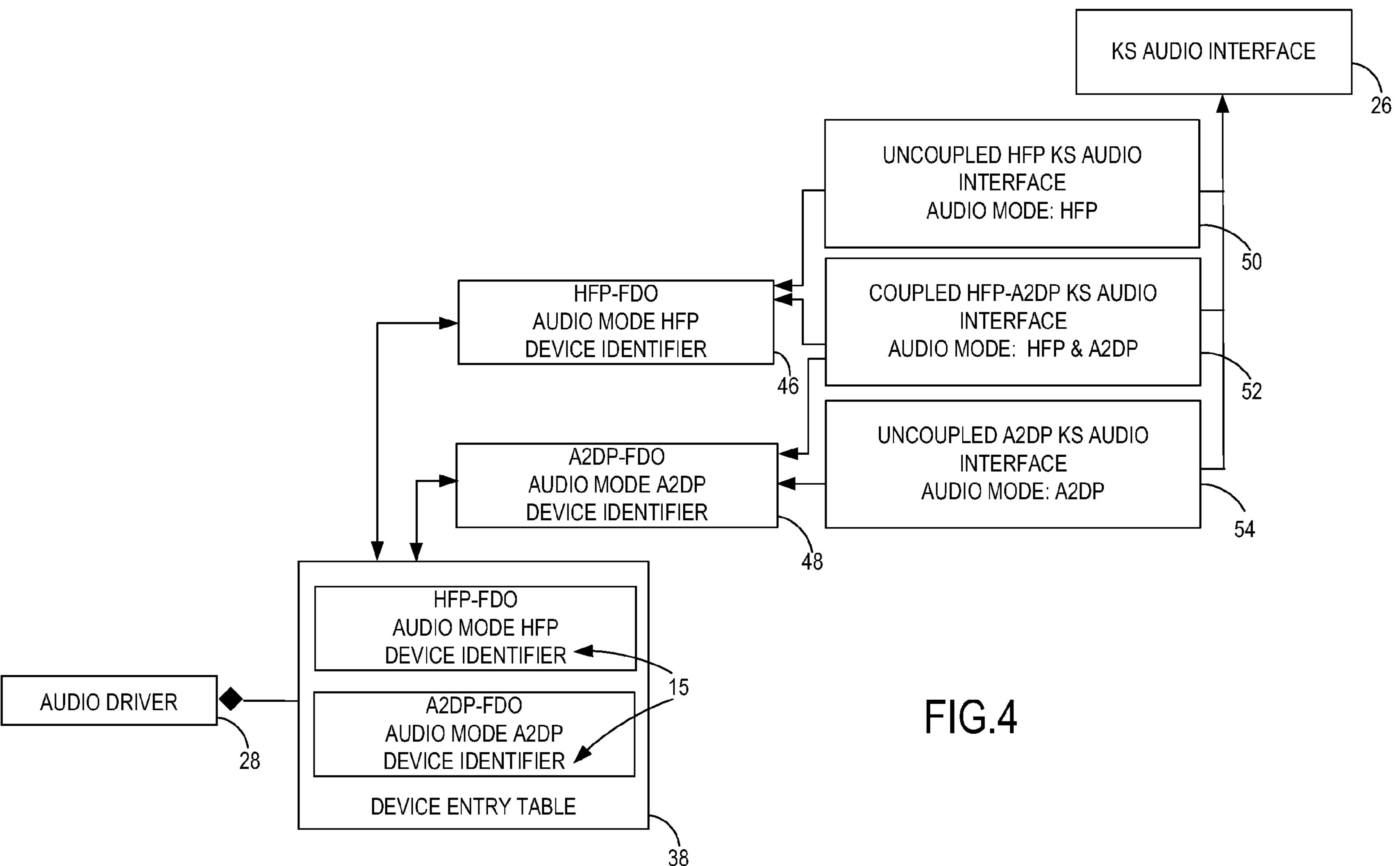
FIG. 4 is a process flow of a method for selecting a kernel streaming audio interface.

FIG. 4 illustrates an example data flow within the audio driver 28 of the computing device for deciding which type of the kernel streaming audio interfaces 26 to implement when streaming audio data to and/or from an audio device that supports both the HFP audio profile and the A2DP audio profile. In this example, the audio driver 28 creates an HFP-FDO 46 for the HFP audio profile and creates an A2DP-FDO 48 for the A2DP audio profile.

The HFP-FDO 46 exposes either an uncoupled HFP audio interface 50 or a coupled HFP-A2DP audio interface 52 depending on whether the device identifier 15 of the HFP-FDO 46 matches with the device identifier 15 of the A2DP-FDO 48. If the device identifiers do not match, the HFP-FDO 46 exposes an uncoupled HFP kernel streaming audio interface 50. On the other hand, if the device identifiers match, the HFP-FDO 46 exposes a coupled HFP-A2DP kernel streaming audio interface 52.

The A2DP-FDO 48 exposes an uncoupled A2DP kernel streaming audio interface 54 or the coupled HFP-A2DP kernel streaming audio interface 52 depending on whether the device identifier 15 of the HFP-PDO 46 matches the device identifier 15 of the A2DP-FDO 48. If the device identifiers match, the A2DP-FDO 48 exposes the coupled HFP-A2DP kernel streaming audio interface 52. On the other hand, if the device identifiers do not match, the A2DP-FDO 48 exposes the uncoupled A2DP kernel streaming audio interface 54.

Figure 5:
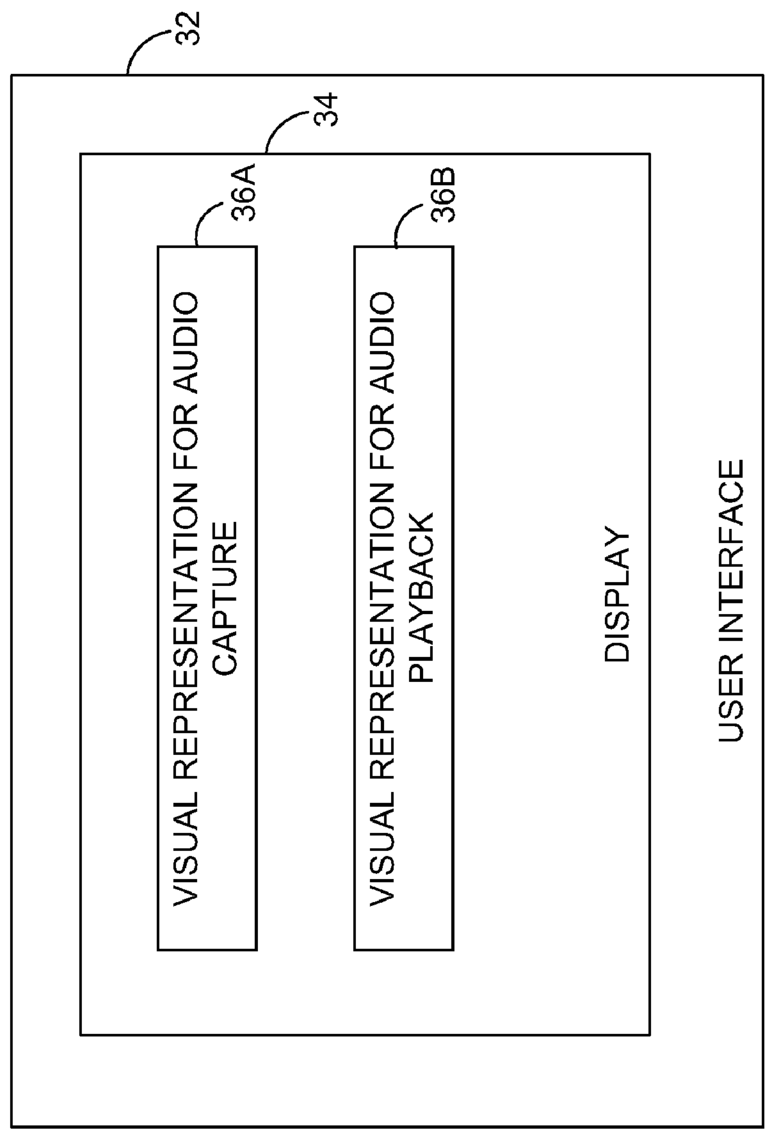
FIG. 5 schematically illustrates a user interface of the computing device of FIG. 1.

FIG. 5 is a schematic diagram illustrating an example user interface 34 configured to display a single visual representation 36A for all audio capture capable modes and a single visual representation 36B for all audio playback capable modes of a single audio device that supports multiple audio modes. In other embodiments, both the audio capture capable modes and the audio playback capable modes may be represented by a single visual element.

Figure 6:
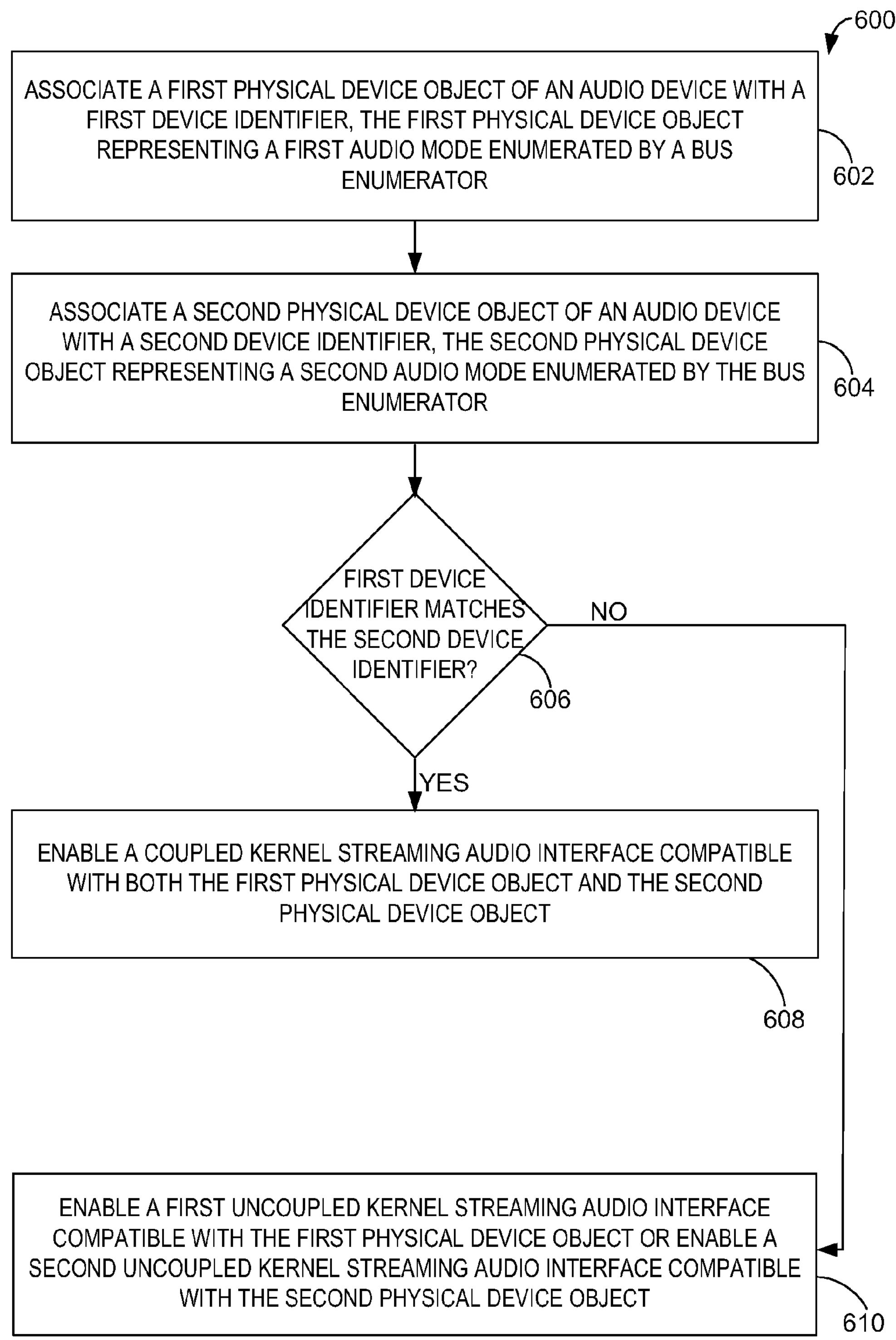
FIG. 6 is a flowchart of a method for driving an audio device that supports two or more audio modes.

FIG. 6 is a flowchart of an example method 600 for driving an audio device supporting two or more audio modes. While the flowchart depicts to coupling of two audio modes, it should be understood that three or more audio modes may be coupled in the same or a similar manner. The method 600 may be implemented by computing device 10 of FIG. 1. The method 600 may include, at 602, associating a first physical device object of an audio device with a first device identifier, the first physical device object representing a first audio mode enumerated by a bus enumerator.

At 604, the method may further include associating a second physical device object of an audio device with a second device identifier, the second device object representing a second audio mode enumerated by the bus enumerator. In some examples, the first audio mode supports mono audio playback and voice capture, and the second audio mode supports stereo audio playback without voice capture. In one specific example, the first audio mode is an HFP audio profile and the second audio mode is an A2DP audio profile.

At 606, the method may include determining whether the first device identifier matches the second device identifier. If the first device identifier matches the second device identifier, the method goes to 608, otherwise, the method goes to 610.

At 608, the method may include enabling a coupled kernel streaming audio interface compatible with both the first physical device object and the second physical device object. The coupled kernel streaming audio interface may implement the first audio mode if the audio device is operating in a first mode, or implement the second audio mode if the audio device is operating in a second mode. Further, the method may include locking a coupled kernel streaming audio interface to an audio mode.

In some examples, the method may further include representing an audio device as a single coherent audio device. For example, the method may include representing all audio capture capable audio modes of the audio device as a single visual representation and representing all audio playback capable audio modes of the audio device as a different single visual representation or the same single visual representation.

At 610, the method may include enabling a first uncoupled kernel streaming audio interface compatible with the first physical device object or enabling a second uncoupled kernel streaming audio interface compatible with the second physical device object.

FIGS. 7-11 are example routines that may be implemented as parts of a method (e.g., method 600) for driving an audio device that supports multiple audio modes.

Figure 7:
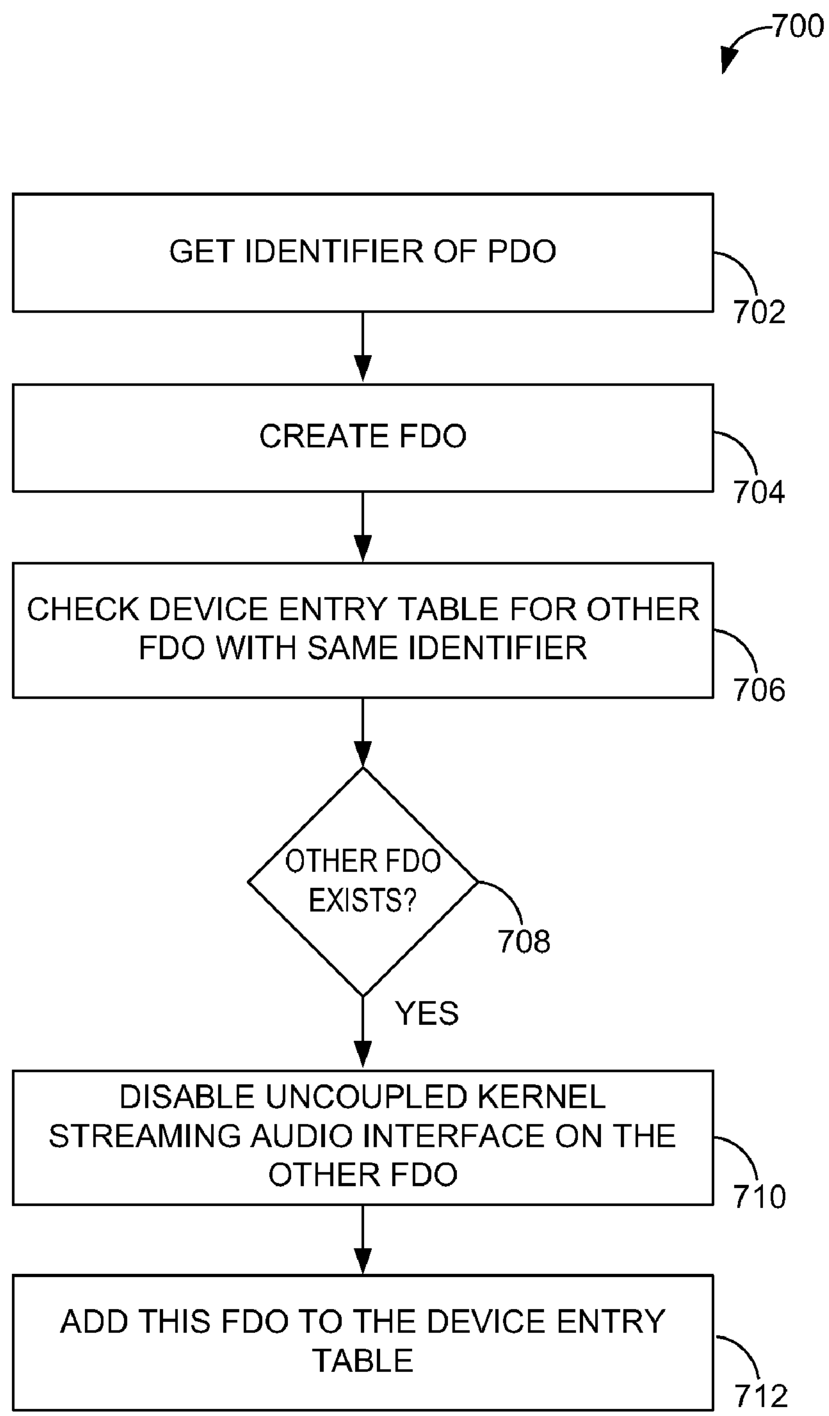
FIG. 7 is a flowchart of an add-audio-device routine that may be implemented for adding an audio device.

Referring now to FIG. 7, this figure is an example add-audio-device routine 700 that may be implemented by a computing device as a part of the method 600 for adding an audio device. The routine 700 may include, at 702, obtaining a device identifier of the PDO enumerated or created by a bus, and at 704, creating an FDO corresponding to the PDO.

The routine may further include at 706, checking the device entry table for another FDO with the same device identifier, and at 708 determining whether such another FDO exists. The routine may further include, at 710, disabling an uncoupled kernel streaming audio interface on the other FDO if the other FDO exists, and at 712, adding the new FDO to the device entry table.

Figure 8:
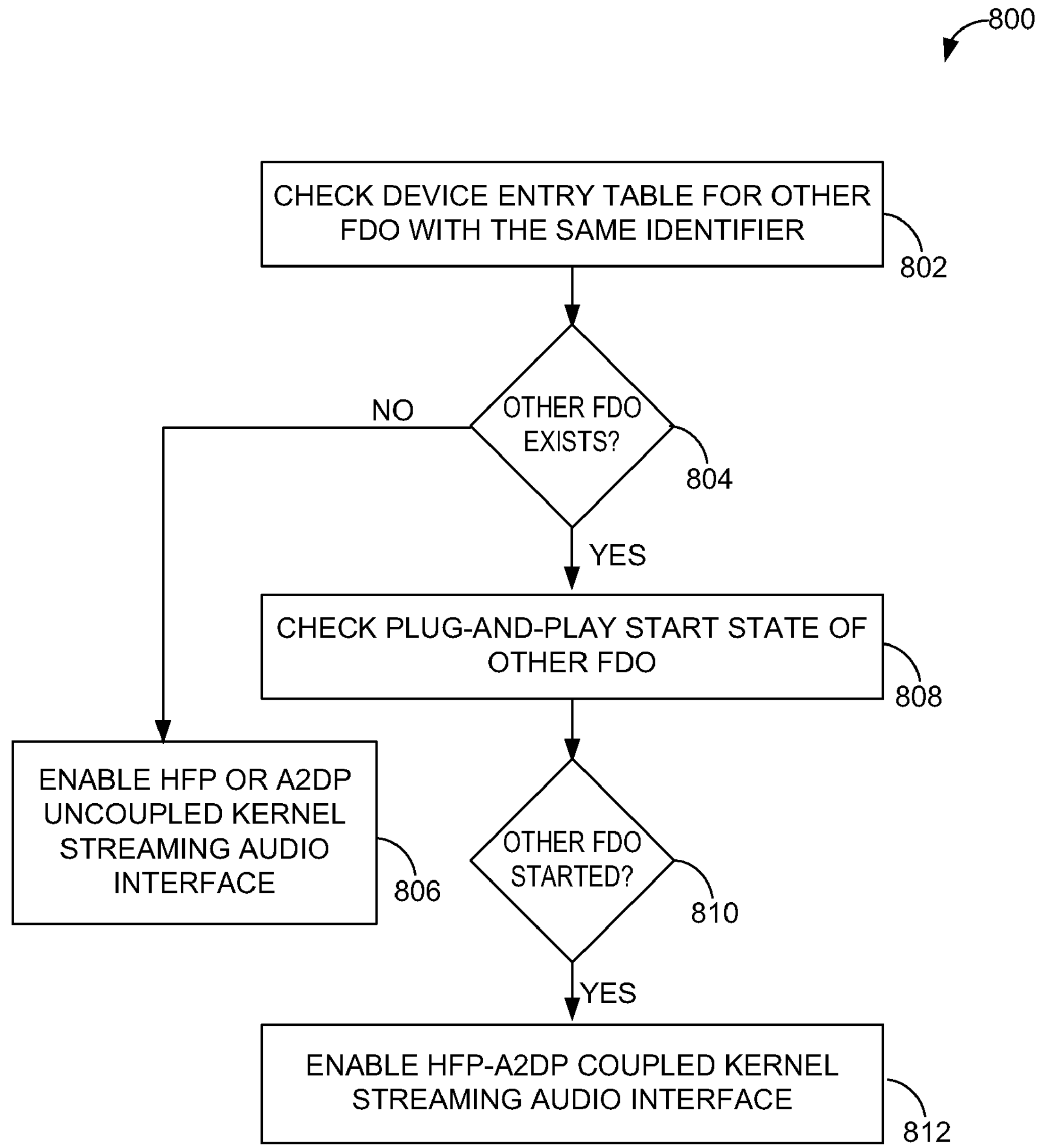
FIG. 8 is a flowchart of a start-audio-device routine that may be implemented for starting an audio device.

FIG. 8 is an example start-audio-device routine 800 for starting the audio device that supports an HFP audio profile and an A2DP audio profile. The routine 800 may include at 802, checking the device entry table for another FDO with the same device identifier, and at 804 determining whether another FDO exists. If another FDO does not exist, the routine 800 proceeds to 806. If another FDO exists, the routine 800 proceeds to 808.

The routine may additionally include, at 806, enabling HFP or A2DP uncoupled kernel streaming audio interface. Alternatively, the routine may include, at 808, checking the plug-and-play start state of the other FDO, and at 810, determining whether the other FDO has been started, and at 812 enabling a coupled HFP-A2DP kernel streaming audio interface if the other FDO has been started.

Figure 9:
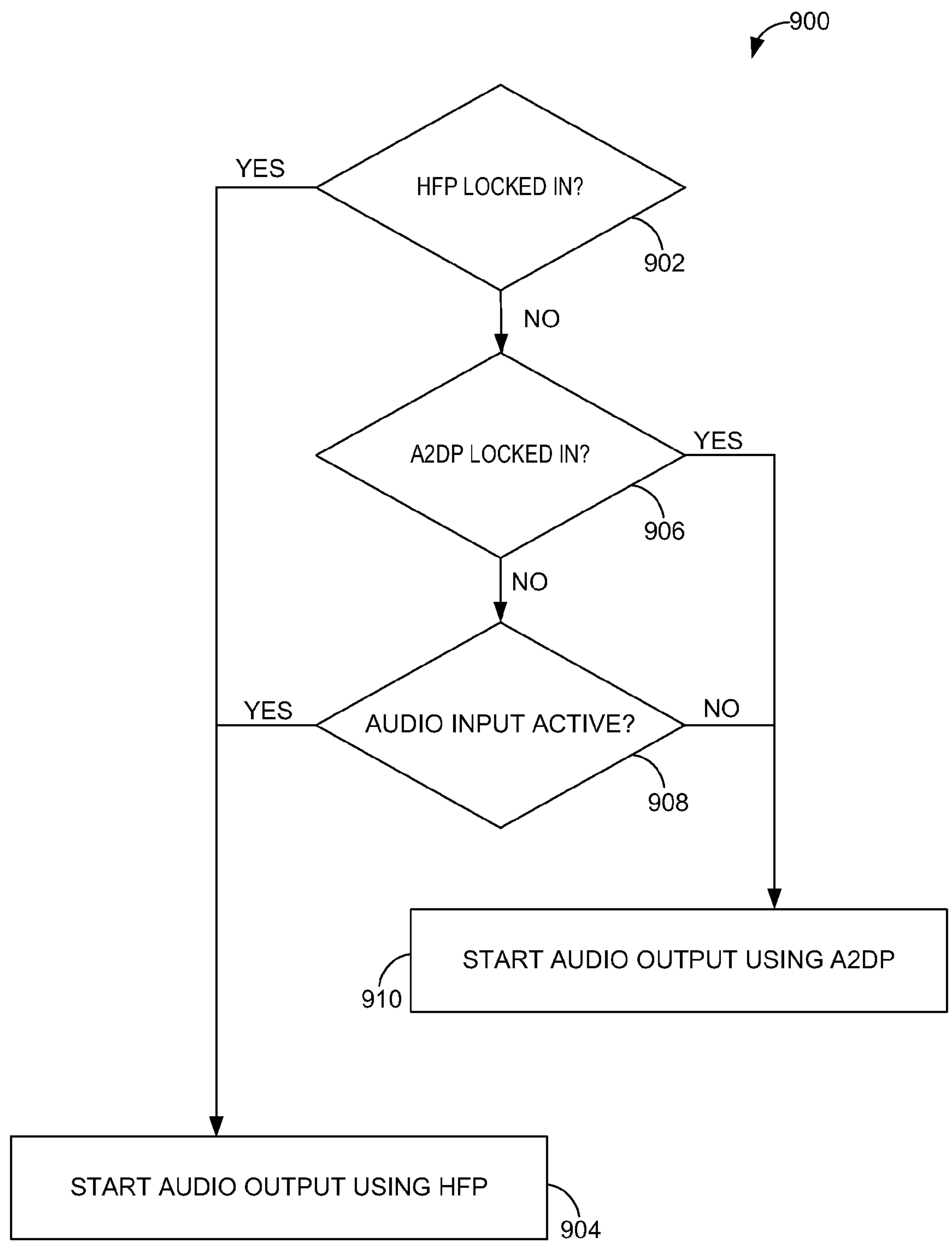
FIG. 9 is a flowchart of an on-audio-output-open routine that may be implemented for selecting the audio mode to use by a coupled HFP-A2DP kernel streaming audio interface, upon initiating audio output streaming to the wireless audio device.

FIG. 9 is a flowchart of an on-audio-output-open routine 900 for selecting the audio mode to use when implementing a coupled HFP-A2DP kernel streaming audio interface upon initiating audio output streaming to the wireless audio device. The routine 900 may include, at 902, determining whether the kernel streaming audio interface is locked in the HFP audio profile. If the HFP is locked in, the routine proceeds to 904. If the HFP is not locked in, the routine proceeds to 906.

The routine may include, at 904, starting audio output of the audio device using the HFP audio profile. Alternatively, the routine may include, at 906, determining whether the kernel streaming audio interface of the audio device is locked in the A2DP audio profile. If the A2DP profile is not locked in, the routine proceeds to 908, otherwise, the routine proceeds to 910.

At 908, the routine may include determining whether audio input of the audio device is active. If the answer is yes, the routine proceeds to 904 to start audio output of the audio device using the HFP audio profile, via for example an uncoupled kernel streaming audio interface that supports the HFP audio profile. If the answer is no, the routine proceeds to 910 to start audio output of the audio device using the A2DP audio profile, via for example an uncoupled kernel streaming audio interface that supports the A2DP audio profile.

Figure 10:
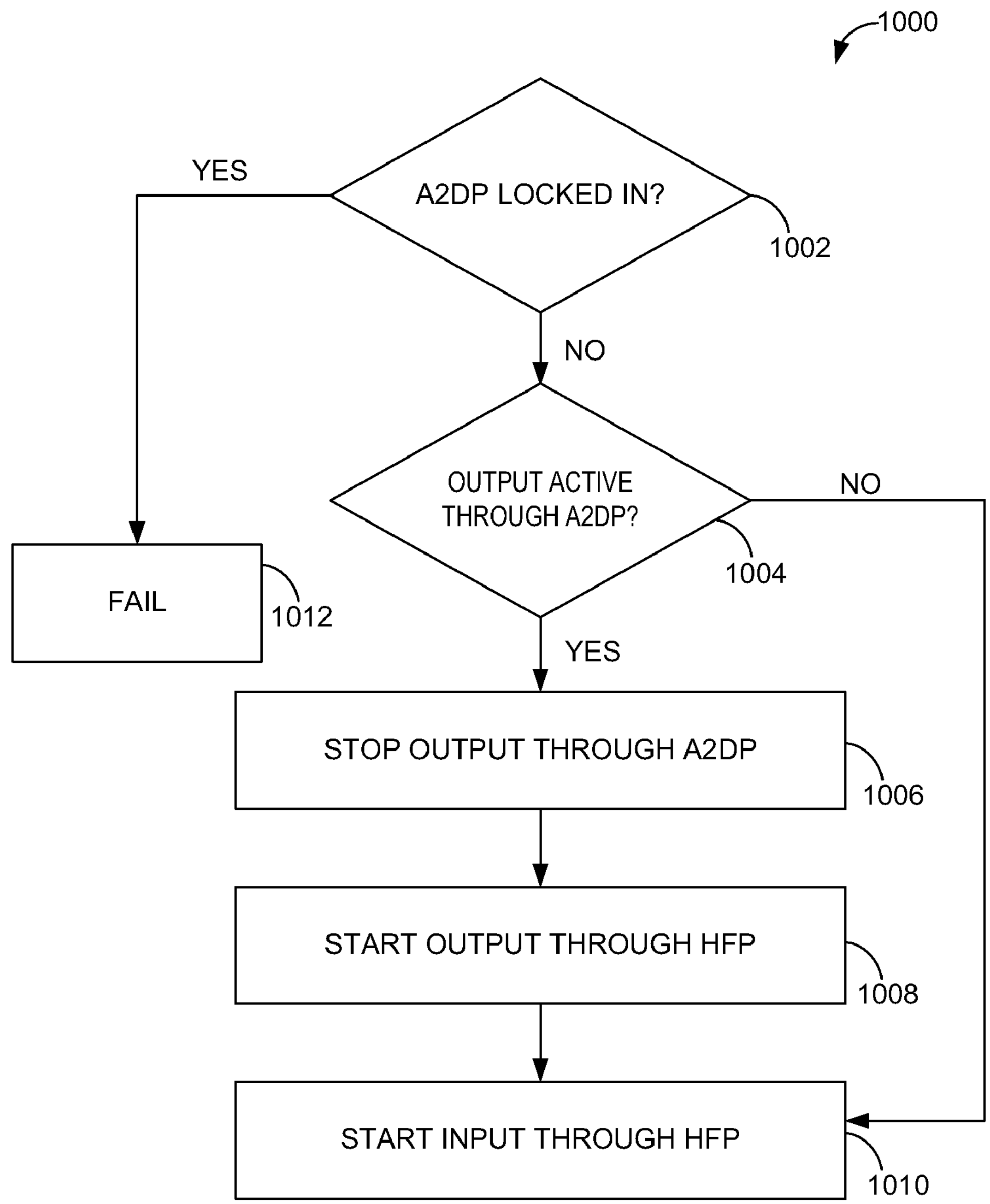
FIG. 10 is a flowchart of an on-audio-input-open routine that may be implemented for selecting the audio mode to use by a coupled HFP-A2DP kernel streaming audio interface, upon initiating audio input streaming from the wireless audio device.

FIG. 10 is an example on-audio-input-open routine 1000 for selecting the audio mode to use by a coupled HFP-A2DP kernel streaming audio interface upon initiating audio input. The routine 1000 may include, at 1002, determining whether the coupled kernel streaming audio interface is locked in the A2DP audio profile. If the answer is yes, the routine 1000 fails at 1012. If the answer is no, the routine proceeds to 1004.

At 1004, the routine may include determining whether audio output of the coupled HFP-A2DP kernel streaming audio interface is active using the A2DP audio profile. If the answer is yes, the routine may include at 1006, stopping audio output of the coupled HFP-A2DP kernel streaming audio interface using the A2DP audio profile. If the answer is no, the routine may proceed to 1010.

The routine may further include, at 1008, starting audio output of the HFP-A2DP kernel streaming audio interface using the HFP audio profile, and at 1010, starting audio input of the HFP-A2DP kernel streaming audio interface using the HFP audio interface.

Figure 11:
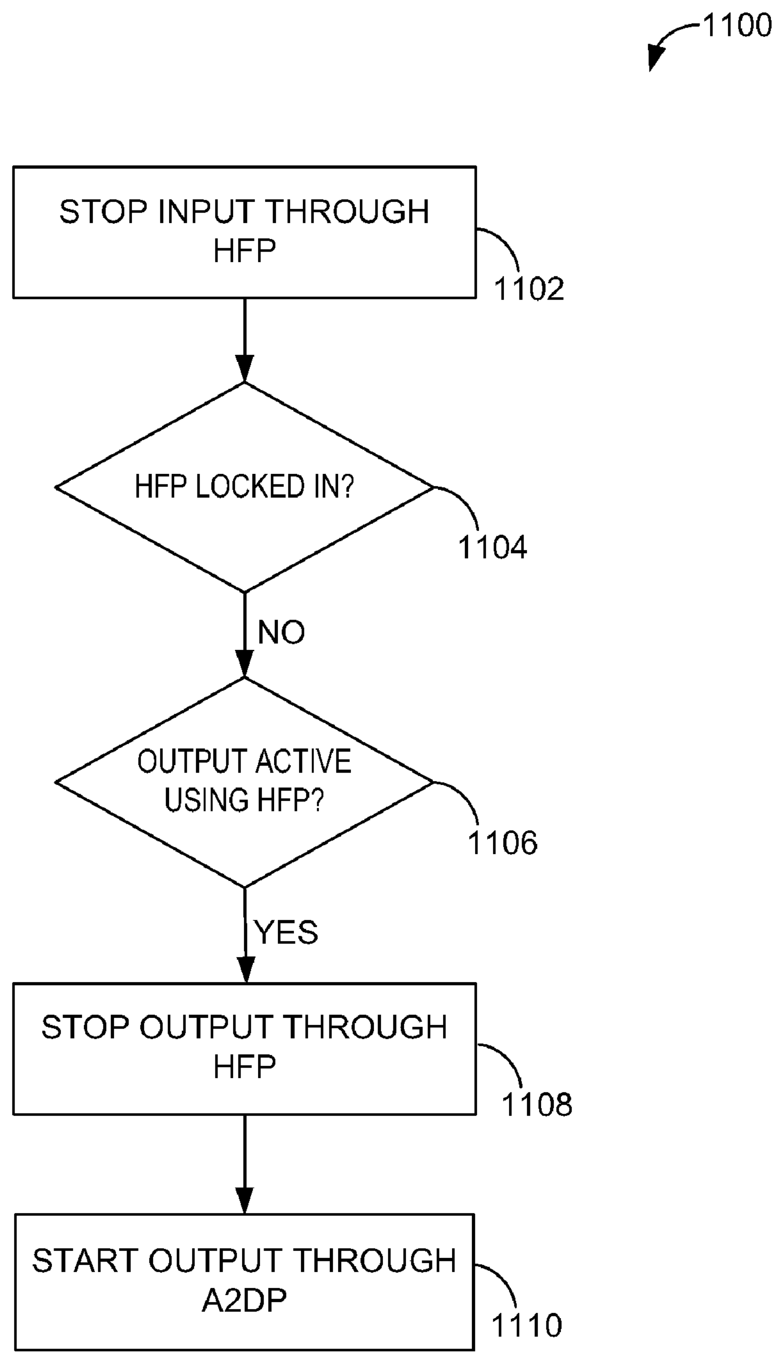
FIG. 11 is a flowchart of on-input-close routine that may be implemented for selecting the audio mode to use by a coupled HFP-A2DP kernel streaming audio interface, upon closing of audio input streaming from the wireless audio device.

FIG. 11 is an example on-audio-input-close routine 1100 for selecting the audio mode to use upon closing of audio input by a coupled HFP-A2DP kernel streaming audio interface. The routine 1100 may include, at 1102, stopping audio input using the HFP audio profile, and at 1104, determining whether the coupled HFP-A2DP kernel streaming audio interface is locked in the HFP audio profile.

If the coupled HFP-A2DP kernel streaming audio interface is not locked in the HFP audio profile, the routine may include at 1106, determining whether audio output is active using the HFP audio profile. If the audio output is active using the HFP audio profile, the routine may include, at 1108, stopping audio output through the HFP audio profile, and at 1110, starting audio output using the A2DP audio profile.

It will be appreciated that the embodiments described herein may be implemented, for example, via computer-executable instructions or code, such as programs, stored on computer-readable storage media and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including two or more such devices acting in concert.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of driving an audio device supporting two or more audio modes, the method comprising:

associating a first physical device object of the audio device with a first device identifier, the first physical device object representing a first audio mode supported by the audio device and enumerated by a bus enumerator, the first audio mode supporting mono audio playback and voice capture;

associating a second physical device object of the audio device with a second device identifier, the second physical device object representing a second audio mode supported by the audio device and enumerated by the bus enumerator, the second audio mode supporting stereo audio playback without voice capture; and if the first device identifier matches the second device identifier, enabling a coupled kernel streaming audio interface compatible with both the first physical device object and the second physical device object, the coupled kernel streaming audio interface configured to implement only the first audio mode if the audio device is operating in a first mode, and implement only the second audio mode if the audio device is operating in a second mode.

2. The method of claim 1, further comprising, if the first device identifier matches the second device identifier, representing an audio device having a matching first device identifier and second device identifier as a single coherent audio device.

3. The method of claim 1, further comprising, if the first device identifier does not match the second device identifier, enabling a first uncoupled kernel streaming audio interface compatible with the first physical device object or enabling a second uncoupled kernel streaming audio interface compatible with the second physical device object.

4. The method of claim 1, further comprising temporarily locking the coupled kernel streaming audio interface to an audio mode.

5. The method of claim 1, where the coupled kernel streaming interface is characterized by a single audio input end point and a single audio output end point.

6. The method of claim 1, where associating the first physical device object with the first device identifier includes listing the first physical device object in a table with the first device identifier, and where associating the second physical device object with the second device identifier includes listing the second physical device object in the table with the second device identifier.

7. The method of claim 6, where the first device identifier includes a device address, and where the second device identifier includes a device address.

8. The method of claim 1, where upon the audio device initiating an audio output, determining if the coupled kernel streaming audio interface is locked to the first audio mode, if the coupled kernel streaming audio interface is locked to the first audio mode, starting audio output using the first audio mode, if the coupled kernel streaming audio interface is not locked to the first audio mode, determining if the coupled kernel streaming audio interface is locked to the second audio mode, if the coupled kernel streaming audio interface is locked to the second audio mode, starting audio output using the second audio mode, if the coupled kernel streaming audio interface is not locked to the first audio mode or the second audio mode, determining if audio input is active, if audio input is active, starting audio output using the first audio mode, if audio input is not active, starting audio output using the second audio mode.

9. The method of claim 1, where upon the audio device initiating an audio input, determining if the coupled kernel streaming audio interface is locked to the second audio mode, if the coupled kernel streaming audio interface is locked to the second audio mode, not starting audio input, if the coupled kernel streaming audio interface is not locked to the second audio mode, determining if audio output is using the second audio mode, if the audio output is using the second audio mode, stopping audio output using the second audio mode, starting audio output using the first audio mode and starting audio input using the first audio mode.

10. The method of claim 1, where upon the audio device closing an audio input, stopping audio input using the first audio mode and determining if the coupled kernel streaming audio interface is locked to the first audio mode, if the coupled kernel streaming audio interface is not locked to the first audio mode, determining if audio output is using the first audio mode, if audio output is using the first audio mode, stopping audio output using the first audio mode and starting audio output using the second audio mode.

11. A computing device comprising computer memory including instructions, that when executed by a logic subsystem, cause the logic subsystem to:

associate a first physical device object of an audio device with a first device identifier, the first physical device object representing a first audio mode enumerated by a bus enumerator, the first audio mode supporting mono audio playback and voice capture;

associate a second physical device object of the audio device with a second device identifier, the second physical device object representing a second audio mode enumerated by the bus enumerator, the second audio mode supporting stereo audio playback without voice capture; and if the first device identifier matches the second device identifier, enable a coupled kernel streaming audio interface compatible with both the first physical device object and the second physical device object, the coupled kernel streaming audio interface configured to implement only the first audio mode if the audio device is operating in a first mode, and implement only the second audio mode if the audio device is operating in a second mode.

12. The computing device of claim 11, where the computing device is further configured to, if the first device identifier matches the second device identifier, represent an audio device having a matching first device identifier and second device identifier as a single coherent audio device via a user interface of the computing device.

13. The computing device of claim 11, where the computing device is further configured to, if the first device identifier matches the second device identifier, represent an audio device having a matching first device identifier and second device identifier as a single coherent audio device via a programming interface of the computing device.

14. The computing device of claim 11, where the computing device is further configured to, if the first device identifier does not match the second device identifier, enable a first uncoupled kernel streaming audio interface compatible with the first physical device object or enable a second uncoupled kernel streaming audio interface compatible with the second physical device object.

15. The computing device of claim 11, where the computing device is further configured to use the coupled kernel streaming audio interface to implement the first audio mode if the audio device is operating in the first mode and to implement the second audio mode if the audio device is operating in the second mode.

16. The computing device of claim 11, where the computing device is further configured to characterize the coupled kernel streaming interface by a single audio input end point and a single audio output end point.

17. Computer memory including instructions that, when executed by a logic subsystem, cause a computing device to drive an audio device supporting two or more audio modes by performing a method comprising:

associating a first physical device object of a wireless audio device with a first device address, the first physical device object representing a Hands-Free Protocol ("HFP") audio profile enumerated by a bus enumerator;

associating a second physical device object of the wireless audio device with a second device address, the second physical device object representing an Advanced Audio Distribution Profile ("A2DP") audio profile enumerated by the bus enumerator; and if the first device identifier matches the second device identifier, enabling a coupled HFP-A2DP kernel streaming audio interface compatible with both the first physical device object and the second physical device object, the coupled HFP-A2DP kernel streaming audio interface configured to implement only the HFP audio profile if the wireless audio device is operating in a first mode, and implement only the A2DP audio profile if the wireless audio device is operating in a second mode.

* * * * *